Oct. 30, 1934.  O. C. GILMORE  1,978,789
APPARATUS FOR MAKING COLOR MOTION PICTURES AND CAMERAS THEREFOR
Filed Nov. 3, 1928  2 Sheets-Sheet 1
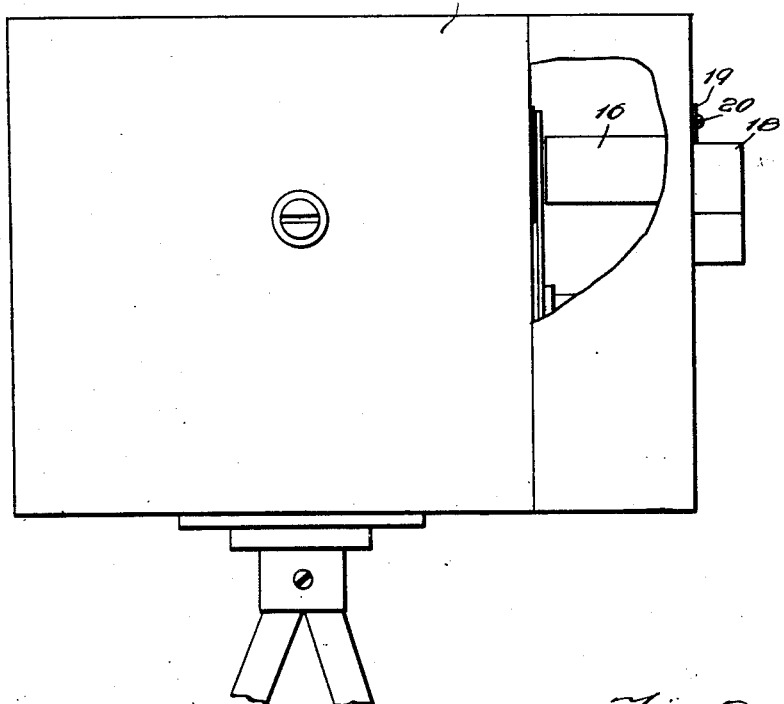
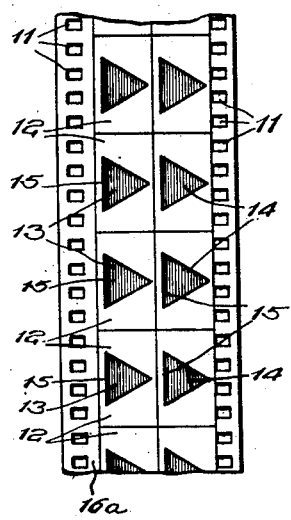
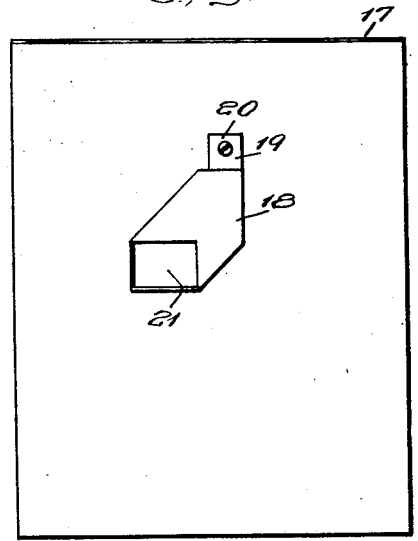
Inventor:
Otto C. Gilmore

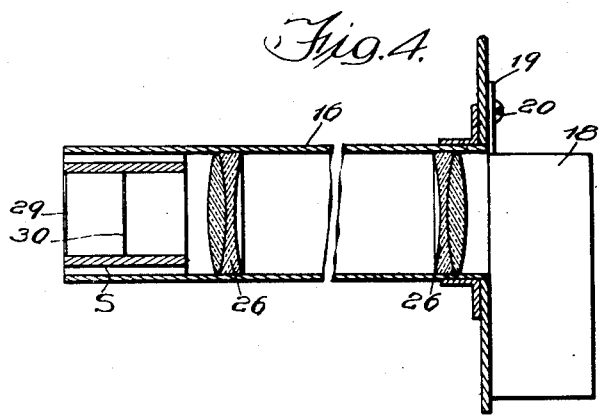
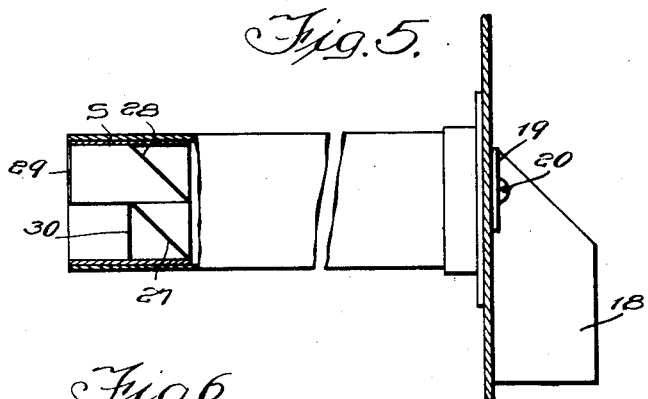
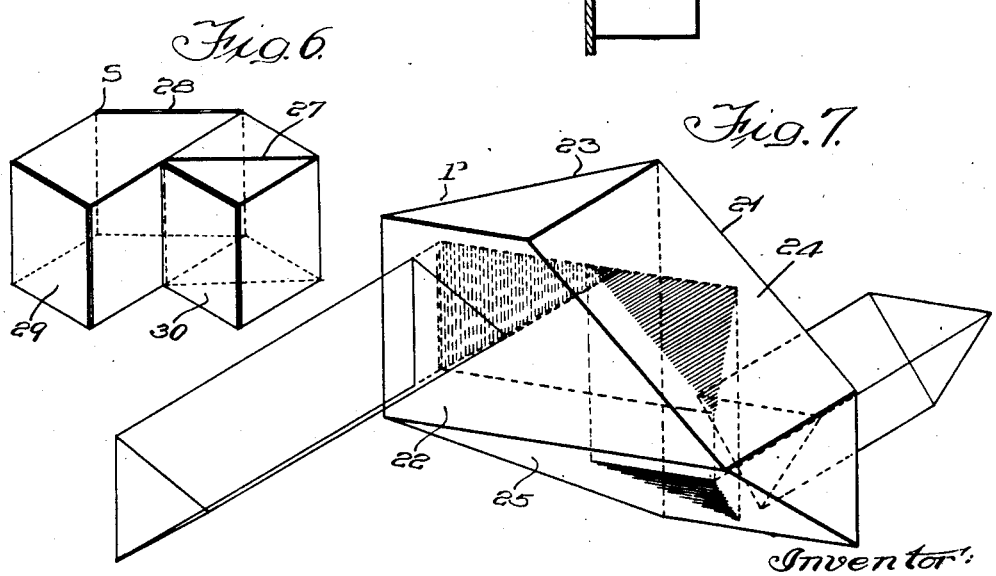

Patented Oct. 30, 1934

1,978,789

UNITED STATES PATENT OFFICE 1,978,789

APPARATUS FOR MAKING COLOR MOTION PICTURES AND CAMERAS THEREFOR

Otto C. Gilmore, Chicago, Ill., assignor, by mesne assignments, to Cinemacolor Corporation, Chicago, Ill., a corporation of Delaware Application November 3, 1928, Serial No. 316,902

1 Claim. (Cl. 88—1)

This invention relates to the apparatus for making motion pictures in natural colors and to the cameras therefor and has for its object the production of negatives wherein all of the images and color records required for the making of a single projected image in color will be located in the space or frame on the film heretofore devoted to a single black and white image. While so locating the images and color records for a single projected image in color in the space or frame normally provided for a single black and white image, the present invention also provides a path for the recording of sound values.

Among its other objects, the present invention contemplates the ready conversion of a standard black and white image camera to one for taking simultaneous images and color records.

With the above and other objects in view, as will be apparent, this invention, among other things, consists in the construction, combination and arrangement of parts, all as hereinafter more fully described, claimed and illustrated in the accompanying drawings, wherein:

Fig. 1 is a side elevation of a standard motion picture camera, with part of the housing broken away, to disclose the present attachment for converting the camera from the taking of black and white images to the taking of color images and records in place therein;

Fig. 2 is a front elevation thereof showing the image turning device in position.

Fig. 3 is an elevation of a section of film made by a camera including the present invention;

Fig. 4 is a longitudinal section taken through the attachment forming part of the subject matter of the present invention;

Fig. 5 is an elevation of said attachment, taken at right angles to Fig. 4, parts thereof being broken away to illustrate the image splitting device and the light filters;

Fig. 6 is a perspective view of the image splitting device and color filters; and Fig. 7 is a perspective view of the image turning device.

Heretofore in the making of motion pictures in natural colors, it has been necessary to use special cameras, which are not adapted to the taking of black and white pictures, and to subject the negatives thus produced to complicated and expensive laboratory treatment. This is occasioned by the fact that it is necessary to take two or more images and color records for each resulting projected image in natural colors. The quantity of negative film heretofore required for pictures in natural colors is two or three times as much as that required for black and white pictures. Furthermore, when these double negatives have been made the positives produced therefrom must be projected in a specially constructed projecting machine or must be processed and treated in the laboratory to correlate the respective color records wherby a single film is produced for projection purposes. The former of these two methods requires each producer to install at least one expensive projecting machine which can be used only in conjunction with color pictures, while the latter method involves extremely expensive laboratory treatment, produces a film that is awkward to handle and is fragile, and wherein the images of the color records are often out of register and open to other serious practical objections.

The present invention is designed to place the making and projecting of motion pictures in natural colors on a parity with the making and projecting of black and white pictures, as to quantity of film used, both negative and positive, the treatment in the laboratory, and the apparatus used in making and projecting.

Where a double color record is used involving one image through a red-orange filter and one through a blue-green filter, the placing of these two images in the space or frame of the film ordinarily occupied by a black and white image would, when the images are positioned normally, either distort the shape and size of the images or so reduce the size that its length projection would be limited. Therefore, the present invention contemplates turning the images through ninety (90°) degrees so that the two images will rest on their ends or sides in a single frame of the negative film. This will also provide ample space between one of the images and the next adjoining marginal perforations for a path for the recording of sound.

Reference being had more particularly to the drawings Fig. 3 illustrates a section of negative film, which is provided with the marginal perforations 11 and a series of spaces or frames 12. Each of these spaces or frames 12 is of a size designed to receive a single black and white image. In the practice of the present invention, a single space or frame 12 receives the red-orange image 13 and the blue green image 14, which are identical except for the individual color records thereof. If 15 represents the respective bottoms of these images 13 and 14, it will be noted that these bottoms 15 of a pair of images in a single space or frame 12, are parallel to the edges of the film 10 and if the images 13 and 14 were projected as shown in Fig. 3, without image turning devices, the resulting projected image would be viewed on its side. Hence the present invention includes an attachment in the camera which, during the process of photographing a single object, will create two images thereof in a single space or frame 12 on the film 10 with the images resting on their sides and their tops and bottoms parallel to the film edges. This method also provides a path 16a for the recording of sound values parallel to the edges of the film 10 and between one row of images 13 and the next adjoining marginal perforations 11.

The attachment designed to create the images 13 and 14 in a space or frame 12 from a single exposure and to turn the images through ninety degrees (90°) so that they rest upon their sides, comprises a tube 16 of a shape and size to enter the lens aperture of a standard camera 17. To convert the camera 17 from the taking of black and white pictures to the taking of moving pictures in natural colors, the lens for black and white photography is removed and the tube 16 inserted in its place.

Cooperating with this front end of the tube 16 is a metallic shell 18, which has a projecting ear 19 through which a screw 20 operates to hold shell 18 in place. The shell 18 houses the image turning prism P (illustrated in Fig. 7), which receives the image of the object and turns it through ninety degrees (90°) before it enters the tube 16. This prism P includes two light transmitting surfaces 21 and 22 and three light reflecting surfaces 23, 24 and 25. One of the transmitting surfaces 21—22 is aligned with the outer end of the tube 16 while the other surface faces the object being photographed. The light bearing the image of the object enters through the transmitting surface 21 and is reflected at right angles by the surface 25 to the reflecting surface 24 where it is again reflected at right angles to the surface 23, which reflects it through the transmitting surface 22 into the tube 16. In being reflected by the surface 24 the image is turned through ninety degrees (90°) to rest upon its side and enters the tube in this position. The paths of the light through the prism P are clearly illustrated in Fig. 7.

Within the tube 16 are the photographic lenses 26 through which the image turned through ninety degrees passes to the rear end of the tube 16. Here the light is passed through the image splitting device S (Figs. 4, 5 and 6) which divides the light to present two images to the film at the rear of the tube 16.

This light splitting device S comprises a combination of prisms or reflecting surfaces which receive, divide and and reflect the light passing through the tube 16. The light first contacts with the surface 27 which permits about half of the light to pass directly through to the rear of the tube 16 and reflects about half of it to the reflecting surface 28. The surface 28 again reflects the light into a path parallel to that passing directly through the surface 27 and through the tube 16. Thus the device S divides the light entering it and converts it into two parallel paths each bearing a complete image.

In order to determine the color records, a blue-green filter 29 is placed in the path of light reflected by the surface 28 and a red-orange filter 30 is placed in the path of light passing directly through the surface 27.

In this manner with a single objective, two duplicate images of different color records are created on the film at the rear of the tube 16, which, because of being turned through ninety degrees (90°), are located on the film in the space or frame 12 occupied by a single black and white image, leaving sufficient space for the sound path 16a. Hence all of the images necessary to make a projected image in color are contained entirely within the confines of a single space or frame 12 and require no more film than do the equivalent projected images in black and white.

What is claimed is:

An attachment for converting an ordinary motion picture camera into a camera for taking color pictures that comprises a tube adapted to replace the lens tube of the camera, a prism at the outer end of said tube having a face through which light to form an image is received and a face through which the light is passed into the tube, each of said faces lying substantially perpendicular to the direction of the light passing therethrough to the camera and said prism also having a plurality of faces for reflecting the light within it and revolving the image through ninety degrees, an objective within the tube, a prism system also within the tube, receiving light from the objective and arranged to split the light into two like images and a colored light filter placed in the path of projection of each image.

OTTO C. GILMORE.